(12) United States Patent
Prieto

(10) Patent No.: US 11,854,416 B2
(45) Date of Patent: Dec. 26, 2023

(54) DRONE STATION, ARRANGEMENT, METHOD OF OPERATING A DRONE STATION, AND COMPUTER READABLE MEMORY

(71) Applicant: Teknologian tutkimuskeskus VTT Oy, Espoo (FI)

(72) Inventor: Raul Prieto, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 126 days.

(21) Appl. No.: 17/606,770

(22) PCT Filed: Jun. 12, 2020

(86) PCT No.: PCT/FI2020/050413
§ 371 (c)(1),
(2) Date: Oct. 27, 2021

(87) PCT Pub. No.: WO2020/249867
PCT Pub. Date: Dec. 17, 2020

(65) Prior Publication Data
US 2022/0223058 A1    Jul. 14, 2022

(30) Foreign Application Priority Data

Jun. 12, 2019    (FI) ..................................... 20195505

(51) Int. Cl.
*G08G 5/00*       (2006.01)
*B64C 39/02*      (2023.01)
(Continued)

(52) U.S. Cl.
CPC ........... *G08G 5/025* (2013.01); *B64C 39/024* (2013.01); *B64U 50/34* (2023.01); *B64U 80/00* (2023.01); *B64U 2101/00* (2023.01)

(58) Field of Classification Search
CPC ........ G08G 5/025; G08G 5/00; B64C 39/024; B64C 39/02; B64U 50/34; B64U 80/00; B64U 2101/00; B64U 10/13; B64U 70/00; B64U 80/70; B64F 1/005; B64F 1/125; B64F 1/222; G05D 1/00
See application file for complete search history.

(56) References Cited

U.S. PATENT DOCUMENTS 10,102,586 B1 *  10/2018  Marlow ................ B64C 39/024
10,223,753 B1 *   3/2019  Marlow ................. G05D 1/106
(Continued)

FOREIGN PATENT DOCUMENTS

EP         3241747 A1    11/2017
JP      2017071233 A     4/2017
(Continued)

*Primary Examiner* — Yonel Beaulieu
(74) *Attorney, Agent, or Firm* — Laine IP Oy

(57) ABSTRACT

According to an example aspect of the present invention, there is provided a drone station comprising a housing having a cavity, and a structure permeable to air and configured to be moved from a first position into a second position and reverse, wherein a platform for landing, storing and starting of a drone is provided by the structure within the cavity in the first position, and wherein an entry into the cavity or an exit out of the cavity through a ventral access is provided for the drone in the second position.

12 Claims, 17 Drawing Sheets

(51) Int. Cl.
*G08G 5/02* (2006.01)
*B64U 50/34* (2023.01)
*B64U 80/00* (2023.01)
*B64U 101/00* (2023.01)

(56) References Cited

U.S. PATENT DOCUMENTS

| | | | |
|---|---|---|---|
| 11,635,057 B2 * | 4/2023 | Sheldon-Coulson | ... B63B 22/18 60/497 |
| 2017/0191829 A1 * | 7/2017 | Van Schoyck | ........ B64C 39/024 |
| 2017/0349283 A1 | 12/2017 | Paunica et al. | |

FOREIGN PATENT DOCUMENTS

| | | | | |
|---|---|---|---|---|
| KR | 1020170104186 A | 9/2017 | | |
| KR | 1020170114463 A | 10/2017 | | |
| KR | 1020180049918 A | 5/2018 | | |
| WO | WO-2018213512 A1 * | 11/2018 | ........... | A47G 29/141 |

\* cited by examiner

DRONE STATION, ARRANGEMENT, METHOD OF OPERATING A DRONE STATION, AND COMPUTER READABLE MEMORY

FIELD

The present invention relates to a drone station.

Further, the present invention relates to an arrangement.

Furthermore, the present invention relates to a method of operating a drone station.

Additionally, the present invention relates to a computer readable memory.

BACKGROUND

Aircrafts such as vertical take-off and landing aerial vehicles (VTOL) and unmanned aerial vehicles (UAV) are commonly known. Said aircrafts are increasingly capable of autonomous flight, for example in transportation, inspection, surveillance and monitoring. Typically, the aircrafts are of electric or electric-hybrid kind and incorporate batteries for providing sufficient power to the motors. Consequently, different stations for landing, storage, starting and charging have been developed for such aircrafts.

For example, document KR 2017114463 A discloses a station for a drone. The station has a control unit for transmitting control commands to an UAV. The control unit further receives sensing data from the UAV. A docking station docks with a body of the UAV according to a predefined mode. A charging unit provides electric power to the docked UAV.

Document EP 3241747 A1 is further directed to a device for receiving a drone. The device comprises a box configured to store a drone. The device further comprises an arm having a first end attached to the box and a second end provided with drone receiving means. The arm is movable between two positions: An unfolded position in which said receiving means extends outside said box so that a drone can be received by said receiving means and a folded position in which said receiving means are contained within said box.

Commercially available drone stations typically do not allow operation of a drone during or after heavy snowfall or require melting of the snow located on the landing pad and/or cover of the respective station. Further, conventional take-off and landing stations often require movement of parts, for example of the landing pad or cover of the station. Typically, the landing pad and the cover of the station are exposed to the elements, for example to snow, ice and/or sand. This may reduce the operational lifetime of the landing pad and/or cover of the station. Melting of the snow located on the landing pad and/or cover of the station may require significant energy consumption. Further, known autonomous aircraft landing pads are not suitable for remote locations, where fauna may access the pad, thus preventing normal operation of the landing pad and/or the landing pad cover.

In view of the foregoing, it would be beneficial to provide a drone station. In particular, it would be beneficial to provide a drone station for use in arctic weather conditions.

SUMMARY OF THE INVENTION

The invention is defined by the features of the independent claims. Some specific embodiments are defined in the dependent claims.

According to a first aspect of the present invention, there is provided a drone station comprising a housing having a cavity, and a structure permeable to air and configured to be moved from a first position into a second position and reverse, wherein a platform for landing, storing and starting of a drone is provided by the structure within the cavity in the first position, and wherein an entry into the cavity or an exit out of the cavity through a ventral access is provided for the drone in the second position.

Various embodiments of the first aspect may comprise at least one feature from the following bulleted list:

- the structure comprises a plurality of openings, borings or holes
- the structure comprises a grating, a grid, an array of objects having at least one opening, or an array of objects between which openings are arranged
- the structure is configured to be moved by a servo motor or a driving system, for example a wheel driving system
- the drone station further comprises a door configured to be moved from an open position into a closed position and reverse
- the door is configured to be moved by a servo motor or a driving system
- the ventral access is covered by the door in the closed position of the door
- the entry into the cavity or the exit out of the cavity through the ventral access is provided for the drone in the open position of the door
- the door comprises a drain hole
- the drone station is hanging from a support structure or arranged on top of a support structure or otherwise coupled to a support structure
- the drone station comprises a transmitter and a receiver for bidirectional communication with the drone
- the drone station comprises a transmitter and a receiver for remotely operating the drone station
- the drone station comprises at least one of a processor, a memory, a user interface, and electric leads
- the drone station comprises a protective scarf attached to the housing
- the drone station comprises a charging system capable of charging batteries of the drone
- the drone station comprises an electric heating system
- the drone station comprises an docking/undocking aid system
- the drone station comprises an imaging system for imaging the drone between two waypoints along a trajectory of the drone
- the drone station comprises a distance measurement system for measuring a distance between the drone and the drone station
- the drone station comprises an energy harvesting system, for example a photovoltaic system, wind energy, a magnetic field energy harvester coupled to an overhead power line, and/or a connection to a power line
- the drone station comprises an electric network connection
- the drone station is configured to be remotely operated, for example via the internet According to a second aspect of the present invention, there is provided an arrangement comprising a drone station according to any one of claims 1-10 and a drone. According to an embodiment, the arrangement comprises a plurality of drone stations according to any one of claims 1-10 in order to provide a network of drone stations for storage and/or charging of at least one drone.

According to a third aspect of the present invention, there is provided a method of operating a drone station, the method comprising (for the drone take-off sequence) moving a door of the drone station from a closed position into an open position, receiving by the drone station a signal that a drone has started from a structure permeable to air (and the drone is airborne), and moving the structure from a first position into a second position, wherein a platform for starting of the drone is provided by the structure within a cavity of a housing of the drone station in the first position, and wherein an exit out of the cavity through a ventral access of the housing is provided for the drone in the second position.

Various embodiments of the third aspect may comprise at least one feature from the following bulleted list:
- guiding the drone out of the cavity of the housing via the ventral access utilizing an aid system, for example a docking/undocking aid system
- imaging the drone between at least two waypoints along a trajectory of the drone
- continuously or stepwise measuring a distance between the drone and the drone station between at least two waypoints along a trajectory of the drone
- receiving by the drone station a starting request from the drone
- transmitting by the drone station a starting permission or a starting request to the drone
- shutting off a heating system prior to moving the door into the open position
- shutting off a charging system prior to moving the door into the open position According to a fourth aspect of the present invention, there is provided a method of operating a drone station, the method comprising moving a door of the drone station from a closed position into an open position, moving a structure permeable to air from a first position into a second position, wherein a platform for landing of a drone is provided by the structure within a cavity of a housing of the drone station in the first position, and wherein an entry into the cavity through a ventral access of the housing is provided for the drone in the second position, receiving by the drone station a signal that the drone is positioned within the cavity, and moving the structure from the second position into the first position.

Various embodiments of the fourth aspect may comprise at least one feature from the following bulleted list:
- guiding the drone into the cavity of the housing via the ventral access utilizing an aid system, for example a docking/undocking aid system
- imaging the drone between at least two waypoints along a trajectory of the drone
- continuously or stepwise measuring a distance between the drone and the drone station between at least two waypoints along a trajectory of the drone
- receiving by the drone station a landing request from the drone
- transmitting by the drone station a landing permission or a landing request to the drone
- turning on a heating system subsequent to moving the door into the closed position
- turning on a charging system subsequent to moving the door into the closed position According to a fifth aspect of the present invention, there is provided a non-transitory computer readable memory having stored thereon a set of computer implementable instructions capable of causing a computing device, in connection with a drone station, at least to cause a door of the drone station to move from a closed position into an open position, receive a signal that a drone has started from a structure permeable to air, and cause the structure to move from a first position into a second position, wherein a platform for starting of the drone is provided by the structure within a cavity of a housing of the drone station in the first position, and wherein an exit out of the cavity through the ventral access of the housing is provided for the drone in the second position.

According to a sixth aspect of the present invention, there is provided a non-transitory computer readable memory having stored thereon a set of computer implementable instructions capable of causing a computing device, in connection with a drone station, at least to cause a door of the drone station to move from a closed position into an open position, cause a structure permeable to air to move from a first position into a second position, wherein a platform for landing of the drone is provided by the structure within a cavity of a housing of the drone station in the first position, and wherein an entry into the cavity through the ventral access of the housing is provided for the drone in the second position, receive a signal that the drone is positioned within the cavity, and cause the structure to move from the second position into the first position.

Considerable advantages are obtained by means of certain embodiments of the present invention. A drone station, an arrangement, a method of operating a drone station and a computer readable memory are provided. In particular, a drone station for use in arctic weather conditions is provided. Due to the ventral access to the cavity within the housing in combination with the structure permeable to air, a drone can hoover inside the housing while the structure is moved from a first position into a second position or in reverse direction. Only a negligible air flow is induced during movement of the structure. Thus, a safe and stable starting or landing procedure can take place. The housing as such protects a drone positioned within the cavity from any kind of precipitation, wind and other objects.

According to certain embodiments, the drone station comprises a protective scarf further protecting the ventral access area from precipitation, side-winds, fauna, and accumulation of snow and/or ice underneath the drone station.

According to certain embodiments, the drone station can be heated by a heating system depending on the ambient air temperature. Thus, a drone can be stored and/or charged in a safe environment between its uses. Melted liquids can exit the housing through a drain hole in a door of the drone station.

According to certain embodiments, the drone station further comprises a transmitter and a receiver in order to bidirectionally communicate with a drone. Additionally, an operator may remotely operate the drone station, may receive status information about the drone station or control certain functionalities of the drone station, for example via the internet.

According to certain embodiments, the drone station comprises a system for harvesting energy. Thus, the drone station is fully autonomous and can be installed at any desired location.

EMBODIMENTS

In this document, the expression "drone" is used. Typically, an aircraft such as an unmanned aerial vehicle (UAV) having vertical take-off and landing (VTOL) capabilities is meant by the expression "drone".

In this document, the expression "drone station" is used. Other expressions for a "drone station" are "hangar", "drone storage", "aircraft station", "drone storage", "nest", "drone nest", "drone landing station", "drone receiving device", etc.

In this document, the expression "vertical" means a direction which is identical with the normal to the surface of the Earth. Further, the expression "horizontal" means a direction which is perpendicular to the normal to the surface of the Earth.

Figure 1:
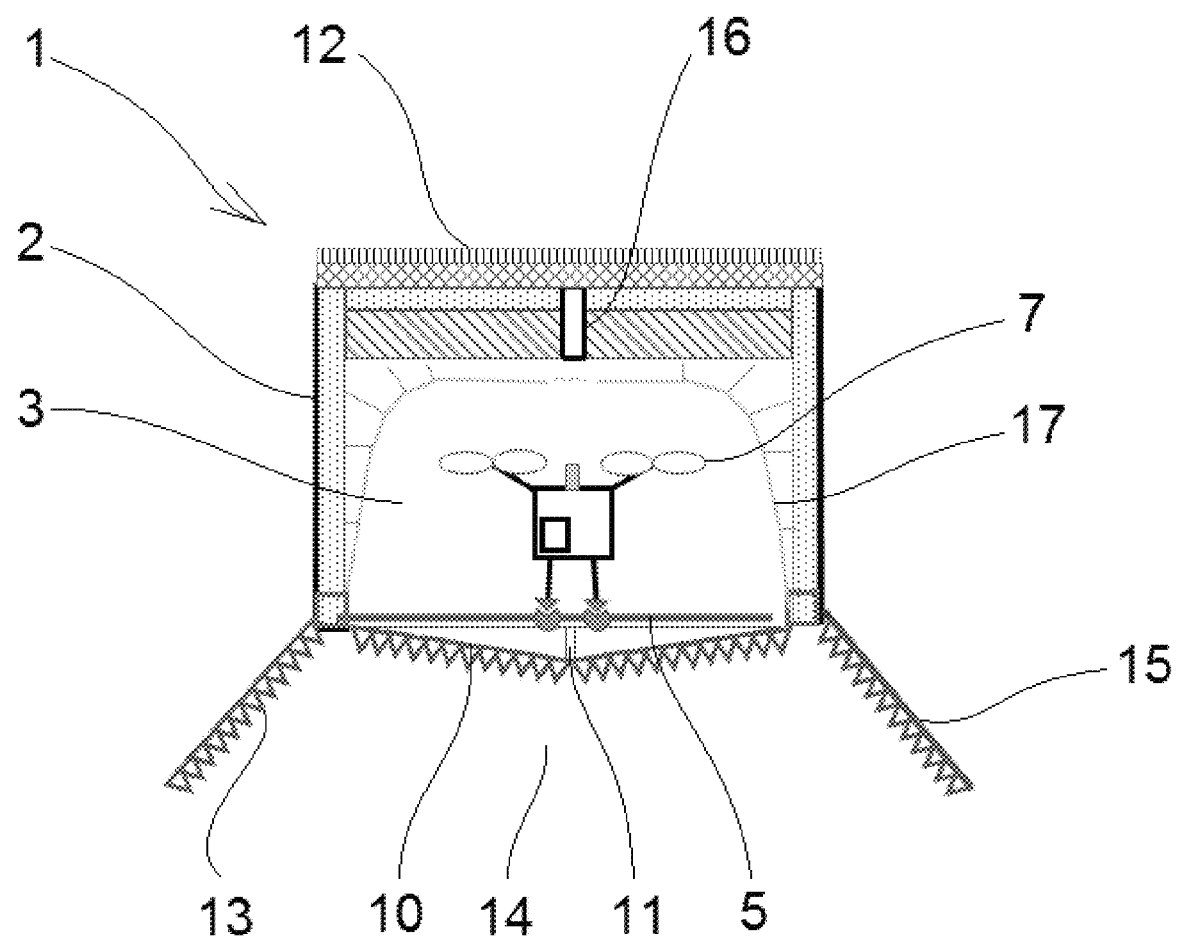
FIG. 1 illustrates a schematic view of a drone station in accordance with at least some embodiments of the present invention.

In FIG. 1 a schematic view of a drone station 1 in accordance with at least some embodiments of the present invention is illustrated. The drone station 1 comprises a housing 2, container or box having a cavity 3. Under certain circumstances the housing 2 of the drone station 1 has a so-called ventral access as shown e.g. in FIGS. 3, 4 and 5. In other words, one side or one surface of the housing 2 has under certain circumstances an opening 4 which allows a drone 7 to enter the cavity 3 from underneath or below the housing 2 through the opening 4 as shown e.g. in FIGS. 3, 4 and 5. Of course, the ventral access also allows a drone 7 to exit the cavity 3 from within the cavity 3 to the underneath through the opening 4, i.e. in reverse direction as shown e.g. in FIGS. 11 and 12. The ventral access is arranged opposite to the top 12 of the housing 2 during use of the drone station 1, because the top 12 of the housing 2 can be exposed to rain, snow or ice, and thus the entry into the cavity 3 and the exit out of the cavity 3 is protected from precipitation. Use of a drone station 1 having a ventral access is in particular beneficial in regions having arctic climate.

The drone station 1 further comprises a structure 5 permeable to air. The structure 5 is configured to be moved from a first position into a second position. In the first position, a platform for landing or storing of a drone 7 is provided by the structure 5. In other words, the structure 5 provides a horizontal or substantially horizontal starting, storage and/or landing platform for a drone 7 in the first position. In the second position, an entry into the cavity 3 or an exit out of the cavity 3 through the ventral access is provided for a flying drone 7. The structure 5 may be, for example, a grating 8 coupled to the housing 2 via at least one hinge 9 as shown and described in more detail in connection with FIG. 15. The structure 5 is typically operated by servo motors or a driving mechanism.

The cavity 3 of the housing 2 is dimensioned such that a drone 7 can within the cavity 3 at least start from and/or land on the structure 5 in vertical direction or in substantially vertical direction. In other words, the cavity 3 of the housing 2 is dimensioned such that the drone 7 can hover within the cavity 3 above the structure 5 in its first position. A landing sequence of a drone 7 in the drone station 1 is described in more detail in connection with FIGS. 2-8. A starting sequence of a drone 7 in the drone station 1 is described in more detail in connection with FIGS. 9-13.

The drone station 1 is typically hanging from a support (not illustrated), standing on top of a support or otherwise coupled to a support.

As shown in FIG. 1, a drone station 1 for use in arctic weather conditions is provided due to housing 2, the ventral access and the movable structure 5. When the drone 7 is stored within the cavity 3 on the structure 5 serving as a storage platform, the drone 7 is protected from precipitation.

According to certain embodiments of the present invention, the drone station 1 may additionally include at least one of the following:

The drone station 1 may further comprise a door 10 configured to be moved from an open position into a closed position as well as in reverse direction. The ventral access is covered by the door 10 in the closed position. The entry into the cavity 3 or the exit out of the cavity 3 through the ventral access is provided for a drone 7 in the open position. Of course, both the structure 5 and the door 10 have to be simultaneously or subsequently moved into an open position for providing the entry into the cavity 3 or the exit out of the cavity 3 through the ventral access. The door 10 is typically operated by servo motors or a driving mechanism. The door 10 may comprise a drain hole 11 for conducting liquids from within the cavity 3 to the outside of the housing 2.

Additionally, the drone station 1 may comprise a charging system for charging of batteries of the drone 7 during storage of the drone 7 on the structure 5. Charging may take place using at least one of a power source such as photovoltaic modules, wind energy, an electric network connection, an energy harvester mounted on an overhead power line and auxiliary batteries.

Further, the drone station 1 may include an electric heating system. The electric heating system may be required for maintaining the systems of the drone station 1 as well as for maintaining the operational systems of the drone 7 during its storage. For example, the electric heating system may be used for heating of the door 10 in order to allow operation of the door 10 at any time needed.

Furthermore, the drone station 1 may comprise a protective scarf 15 coupled to the perimeter wall or bottom wall of the housing 2 to prevent precipitation and fauna from reaching the ventral access. The external part of the scarf 15 can serve as a bird slope deterrent, for instance. The protective scarf 15 may be coated with anti-ice coating in order to minimize ice accretion. The protective scarf 15 also shields the ventral access area 14 from wind and reduces turbulences in the ventral access area 14, thus improving safe entry into and exit out of the drone station 1 for a drone 7. The protective scarf 15 may include objects 13 such as spikes or objects having a cross section in the form of a triangle in order to prevent animals from getting close to the drone station 1 and to prevent animals from building a nest in the ventral access area. The objects 13 may be arranged at the bottom side of the scarf 15. Such objects 13 may also be connected to the door 10. The shape of the objects 13 can be selected such that the size of the vortices in the ventral access area 14 caused by side-wind can be reduced. For example, large objects having a cross section in the form of a triangle at the edge of the scarf 15 reduce the size of the vortices, thus contributing to a more stable flight of the drone 7 in the ventral access area 14.

Figure 18:
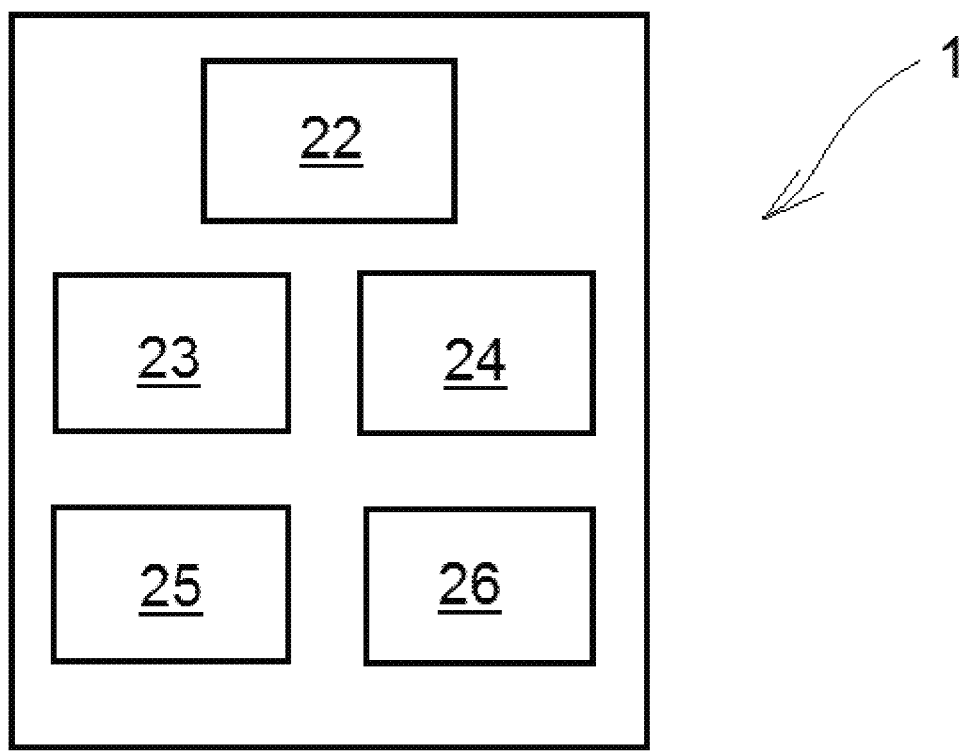
FIG. 18 illustrates a schematic view of a yet further drone station in accordance with at least some embodiments of the present invention.

Additionally, the drone station 1 may comprise a processor 22 as shown in FIG. 18. The processor 22 may comprise, for example, a single- or multi-core processor. A single-core processor comprises one processing core and a multi-core processor comprises more than one processing core. The processor 22 may further comprise more than one processor. A processing core may comprise, for example, a Cortex-A8 processing core manufactured by ARM Holdings or a Steamroller processing core produced by Advanced Micro Devices Corporation. Processor 22 may comprise at least one Qualcomm Snapdragon and/or Intel Atom processor. Processor 22 may comprise at least one application-specific integrated circuit, ASIC. Processor 22 may comprise at least one field-programmable gate array, FPGA. Processor 22 may be means for performing method steps in drone station 1. Processor 22 may be configured, at least in part by computer instructions, to perform actions.

Further, the drone station 1 may comprise at least one memory 23. Memory 23 may comprise random-access memory and/or permanent memory as shown in FIG. 18. Memory 23 may comprise at least one RAM chip. Memory 23 may comprise solid-state, magnetic, and/or optical memory, for example. Memory 23 may be at least in part accessible to processor 22. Memory 23 may be at least in part comprised in processor 22. Memory 23 may be means for storing information. Memory 23 may comprise computer instructions that processor 22 is configured to execute. When computer instructions configured to cause processor 22 to perform certain actions stored in memory 23, and drone station 1 overall is configured to run under the direction of processor 22 using computer instructions from memory 23, processor 22 and/or its at least one processing core may be considered to be configured to perform said certain actions. Memory 23 may be at least in part external to drone station 1 but accessible to drone station 1.

Furthermore, the drone station 1 may comprise a transmitter 24 for transmitting data and a receiver 25 for receiving data as shown in FIG. 18. The transmitter 24 and the receiver 25 may be configured to transmit and receive, respectively, information in accordance with at least one communication standard. The transmitter 24 may comprise more than one transmitter. The receiver 25 may comprise more than one receiver. The transmitter 24 and/or the receiver 25 may be configured to operate in accordance with global system for mobile communication, GSM, wideband code division multiple access, WCDMA, 5G, long term evolution, LTE, IS-95, wireless local area network, WLAN, Ethernet and/or worldwide interoperability for microwave access, WiMAX, standards, for example. The receiver 25 may be configured to receive signals from an external positioning system, for example a GPS satellite signal. The drone station 1 may comprise a single receiver for receiving data or a plurality of different receivers.

The processor 22 may be furnished with a transmitter arranged to output information from processor 22, via electrical leads internal to drone station 1, to other systems comprised in drone station 1. Such a transmitter may comprise a serial bus transmitter arranged to, for example, output information via at least one electrical lead to memory 23 for storage therein. Alternatively to a serial bus, the transmitter may comprise a parallel bus transmitter. Likewise processor 22 may comprise a receiver arranged to receive information in processor 22, via electrical leads internal to drone station 1, from other systems comprised in drone station 1. Such a receiver may comprise a serial bus receiver arranged to, for example, receive information via at least one electrical lead from receiver for processing in processor 22. Alternatively to a serial bus, the receiver may comprise a parallel bus receiver.

Additionally, the drone station 1 may comprise a user interface 26 for data input as shown in FIG. 18. Data input may be required for controlling functions of the drone station 1. Data may be input by a user or operator, for instance. The user interface 26 may be permanently or temporarily comprised by the drone station 1. The user interface may be, for example, a keyboard, at least one button, a touchscreen, etc.

The processor 22, memory 23, transmitter(s) 24, receiver(s) 25, readout circuitry and/or user interface 26 may be interconnected by electrical leads internal to drone station 1 in a multitude of different ways. For example, each of the aforementioned systems may be separately connected to a master bus internal to drone station 1, to allow for the systems to exchange information. However, as the skilled person will appreciate, this is only one example and depending on the embodiment various ways of interconnecting at least two of the aforementioned systems may be selected without departing from the scope of the present invention.

Figure 2:
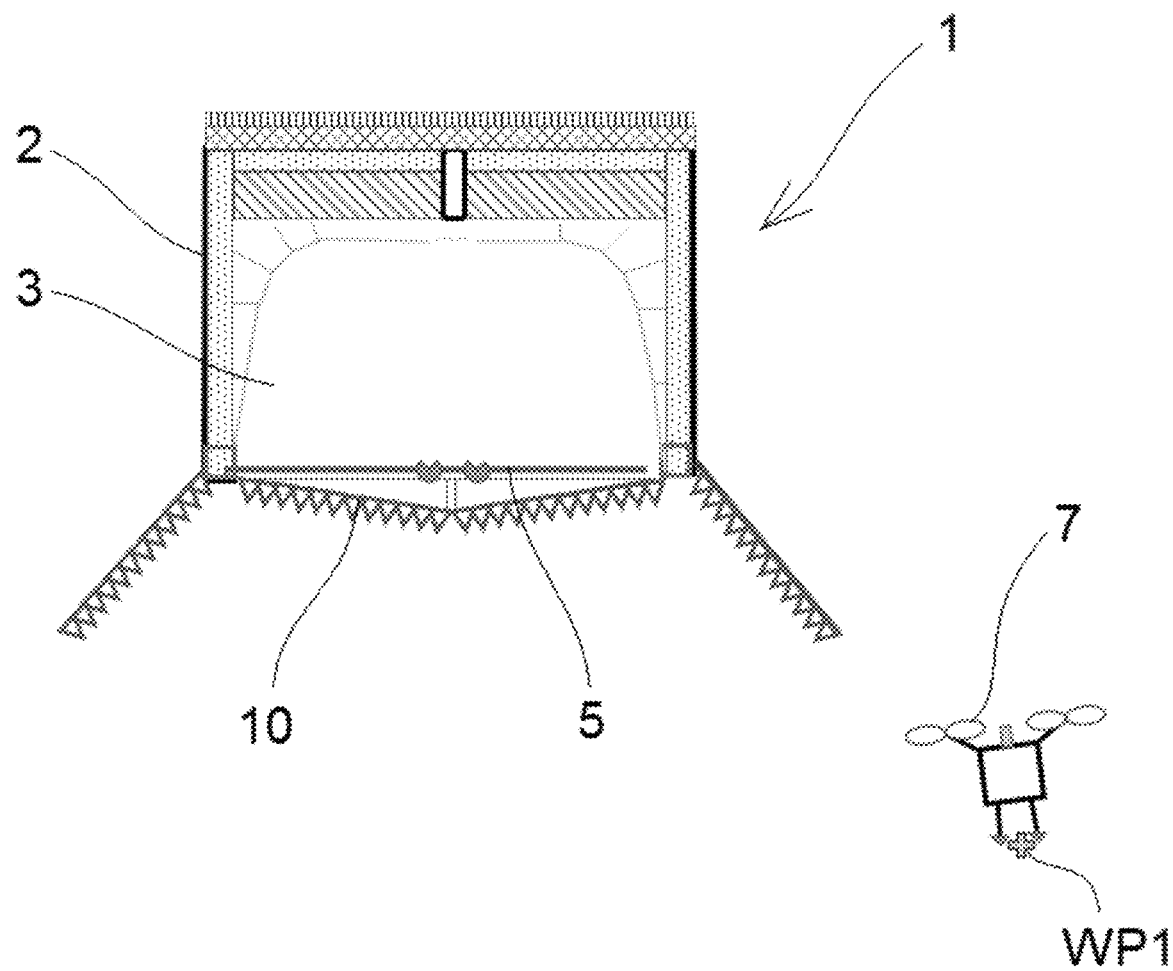
FIG. 2 illustrates a schematic view of a drone station in accordance with at least some embodiments of the present invention, wherein a first step of a drone landing sequence is shown.

In FIG. 2 a schematic view of a drone station 1 in accordance with at least some embodiments of the present invention is illustrated, wherein a first step of a drone landing sequence is shown. It can be seen that a drone 7 is located close to the drone station 1 at a first waypoint WP1. The first waypoint WP1 has a vertical and horizontal offset to the drone station 1. The structure 5 of the drone station 1 is in its first position and the door 10 is in the closed position, i.e. the ventral access to the cavity 3 of the housing 2 is closed.

Figure 3:
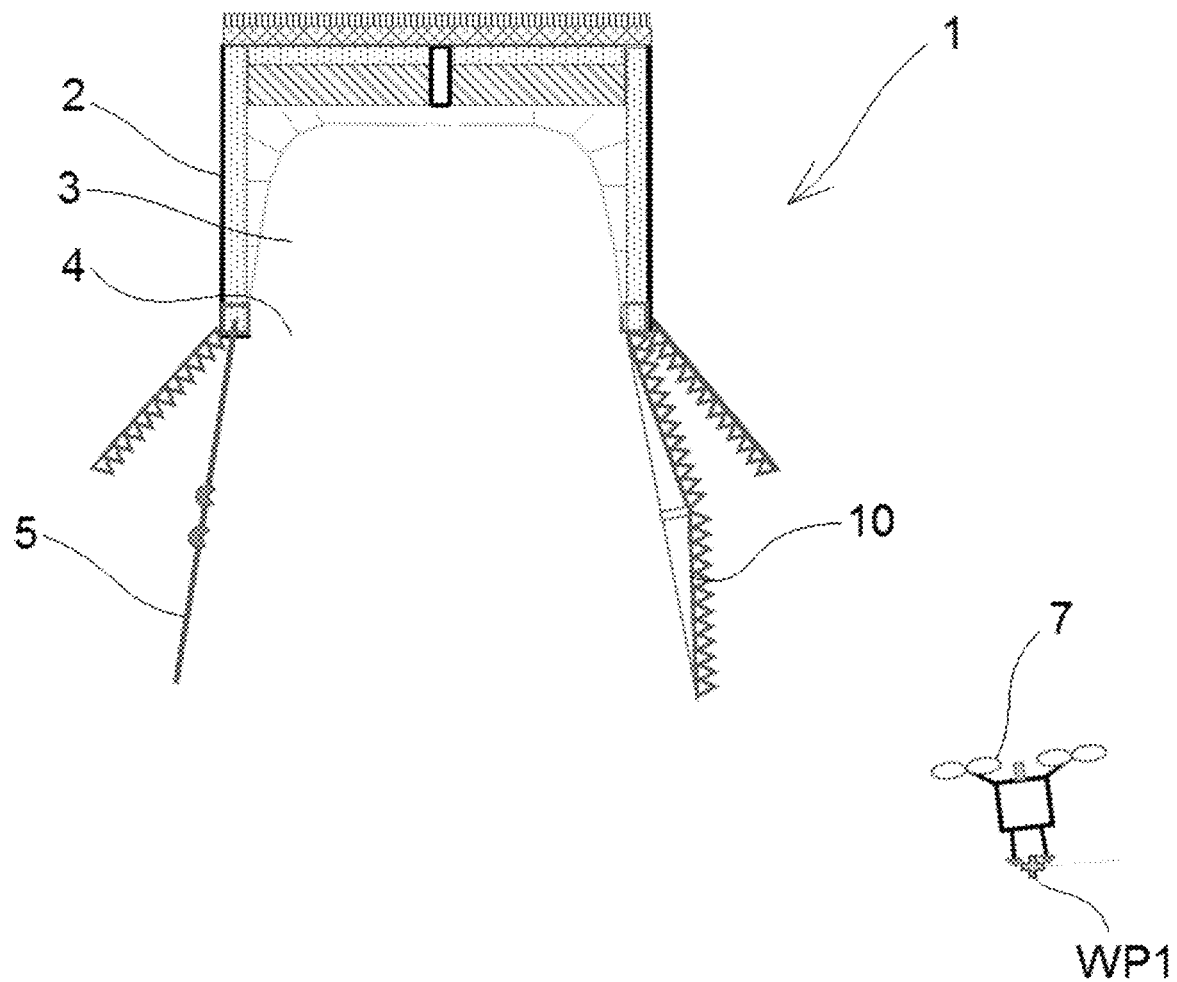
FIG. 3 illustrates a schematic view of a drone station in accordance with at least some embodiments of the present invention, wherein a second step of a drone landing sequence is shown.

In FIG. 3 a schematic view of a drone station 1 in accordance with at least some embodiments of the present invention is illustrated, wherein a second step of a drone landing sequence is shown. In the second step, the door 10 moves from the closed position into the open position. Subsequently, also the structure 5 moves into its second position. Thus, an entry into the cavity 3 through the ventral access is provided for the drone 7. In other words, an opening 4 which allows the drone 7 to enter the cavity 3 from underneath is provided in the housing 2. A free flight path is provided for allowing the drone 7 to reach the cavity 3 of the drone station 1.

Opening of the door 10 and movement of the structure 5 into the second position may take place subsequent to wireless transmission of a signal from the drone 7 to the drone station 1. The signal may contain information about the distance between the drone 7 and the drone station 1 or a landing request, for instance. A processor comprised by the drone station 1 is capable of processing the signal received from the drone 7. The at least one memory of the drone station 1 includes computer program code. The at least one memory and the computer program code are configured to, with the at least one processing core, cause the drone station 1 to open the door 10 and to move the structure 5 into the second position. This may take place, for example, when a distance between the drone 7 and the drone station 1 is less than a predefined reference distance or when a landing request from the drone 7 is received by the drone station 1. The at least one memory and the computer program code may be further configured to, with the at least one processing core, transmit to the drone 7 a signal that a free flight-path is provided when the door 10 is in its open position and the structure 5 has been moved into the second position.

Figure 4:
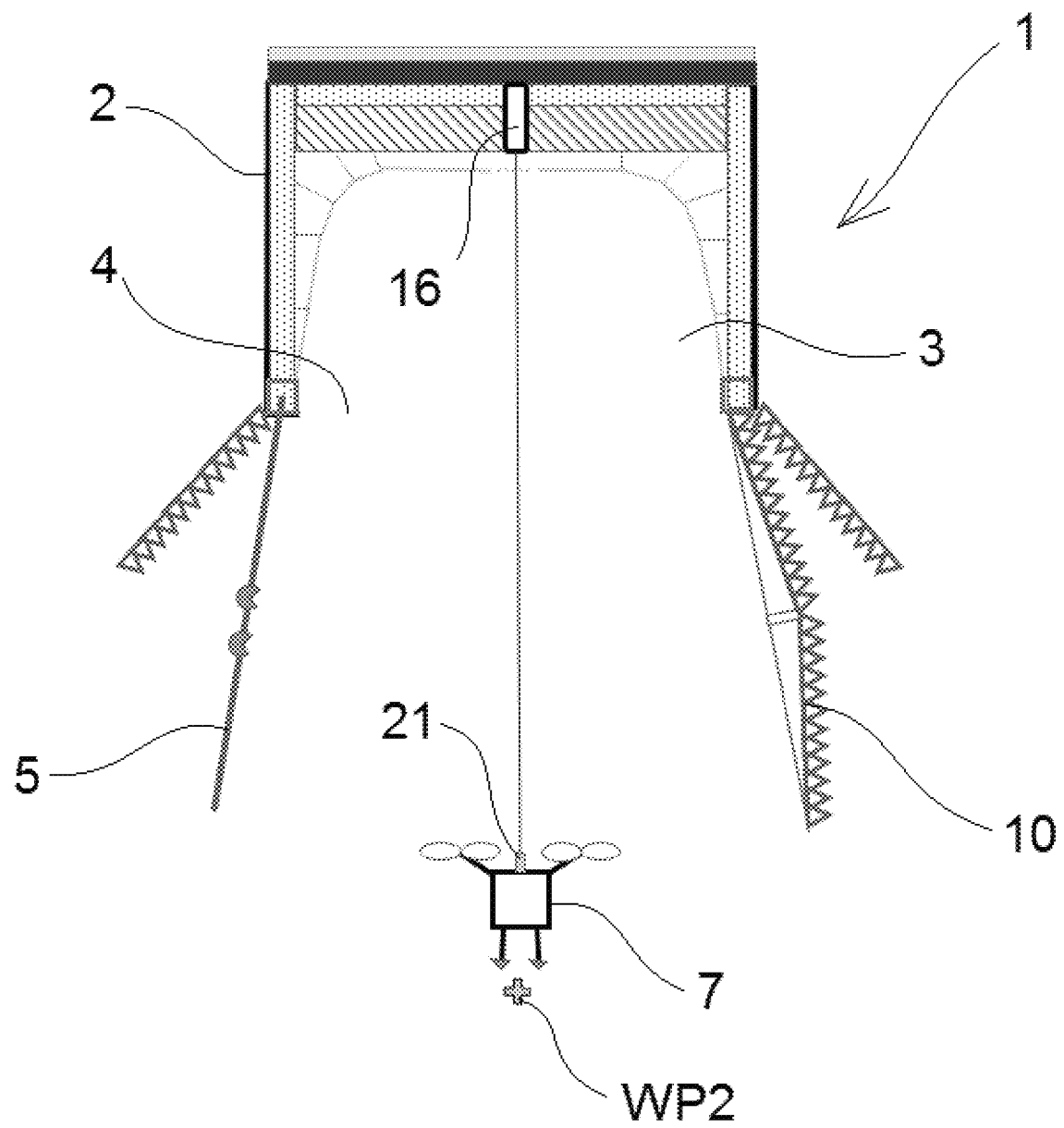
FIG. 4 illustrates a schematic view of a drone station in accordance with at least some embodiments of the present invention, wherein a third step of a drone landing sequence is shown.

In FIG. 4 a schematic view of a drone station 1 in accordance with at least some embodiments of the present invention is illustrated, wherein a third step of a drone landing sequence is shown. The drone 7 has now arrived at a second waypoint WP2 below the housing 2 of the drone station 1. The second waypoint WP2 has a vertical offset to a docking waypoint, a sensor of a docking aid system, or a marker, for instance. After having arrived at the second waypoint WP2, the drone 7 moves in vertical direction or in substantially vertical direction towards the cavity 3 of the housing 2 of the drone station 1.

The flight path of the drone 7 between the second waypoint WP2 and the cavity 3 may be assisted by a docking/undocking aid system 16. In particular, the docking/undocking aid system 16 is beneficial to ensure that the position of the drone 7 is aligned with a predetermined flight path. The docking/undocking system 16 may be an optical system, for example. The aid system 16 may comprise an imaging system and a distance measurement sensor, for instance. The drone 7 may comprise a marker 21, for instance. Of course, the aid system 16 may be also comprised by the drone 7 and the marker 21 may be comprised by the drone station 1. The drone 7 and the drone station 1 may be configured to bidirectionally communicate with each other. For example, the drone station 1 may transmit a signal to the drone 7 that the drone 7 is aligned with the predetermined flight path or that the drone 7 is not aligned with the predetermined flight path. In case of misalignment, the drone 7 may receive a signal from the drone station 1 that the drone 7 is not aligned with the predetermined flight path and change its position in response.

Figure 5:
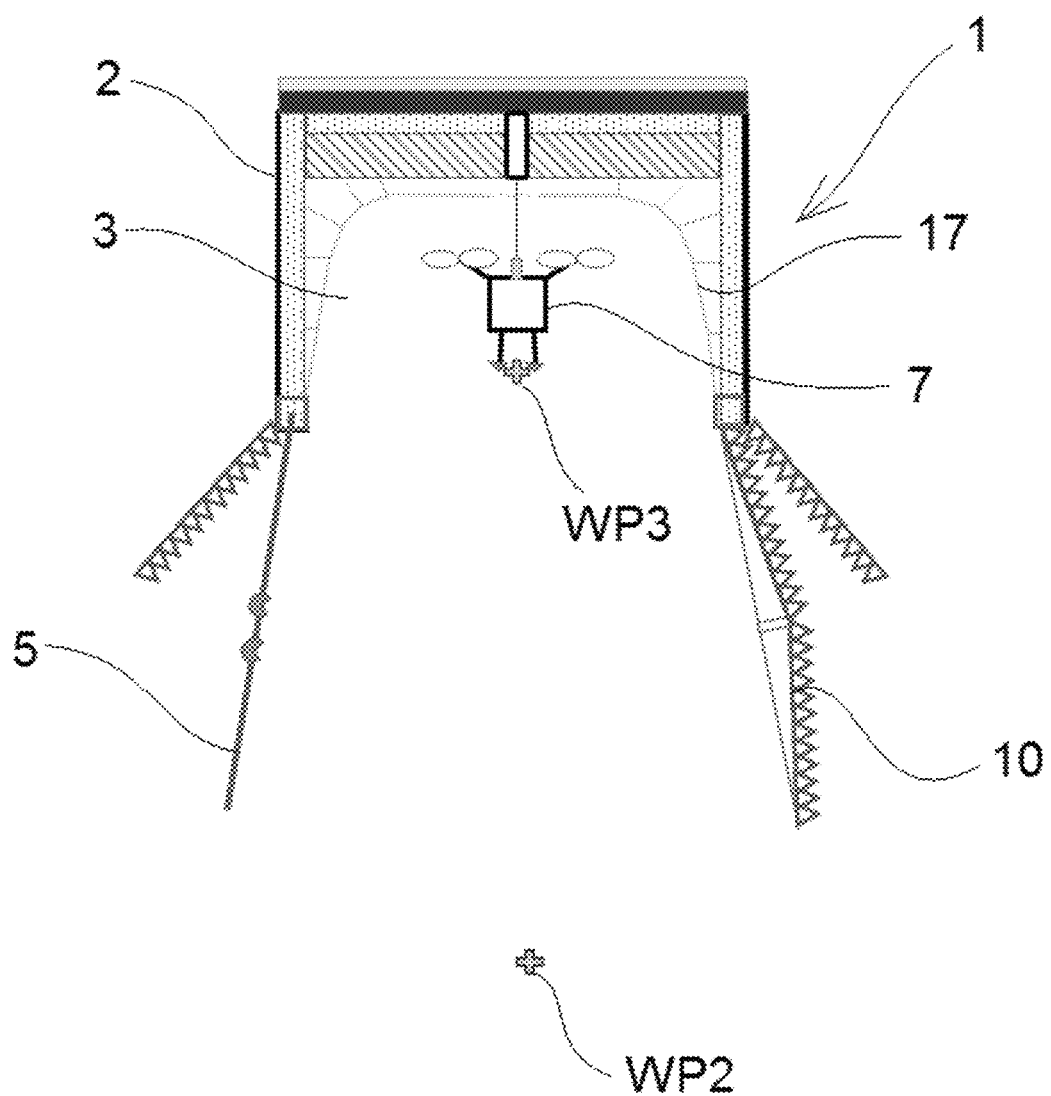
FIG. 5 illustrates a schematic view of a drone station in accordance with at least some embodiments of the present invention, wherein a fourth step of a drone landing sequence is shown.

In FIG. 5 a schematic view of a drone station 1 in accordance with at least some embodiments of the present invention is illustrated, wherein a fourth step of a drone landing sequence is shown. The drone 7 has now arrived at a third waypoint WP3 within the cavity 3 of the housing 2 of the drone station 1. Within the cavity 3 the position of the drone 7 may be controlled utilizing the docking/undocking aid system 16 as described above. Thus, the optical alignment reference is kept on the axis defined by the docking/undocking aid system 16. In this process, the flight control of the drone 7 may further use an illumination light of the drone station 1, at least one marker, at least one mirror or a signal provided by the drone station 1. The signal may be, for example, a signal associated with a camera system or a distance measurement system comprised by the drone station 1.

The drone station 1 may be equipped with a damper 17 which protects the hoovering drone 7 from contacting the housing 2. The damper 17 may be made from some textile or foam, for instance. The damper 17 is typically coupled to the housing 2 or a frame of the housing 2.

Figure 6:
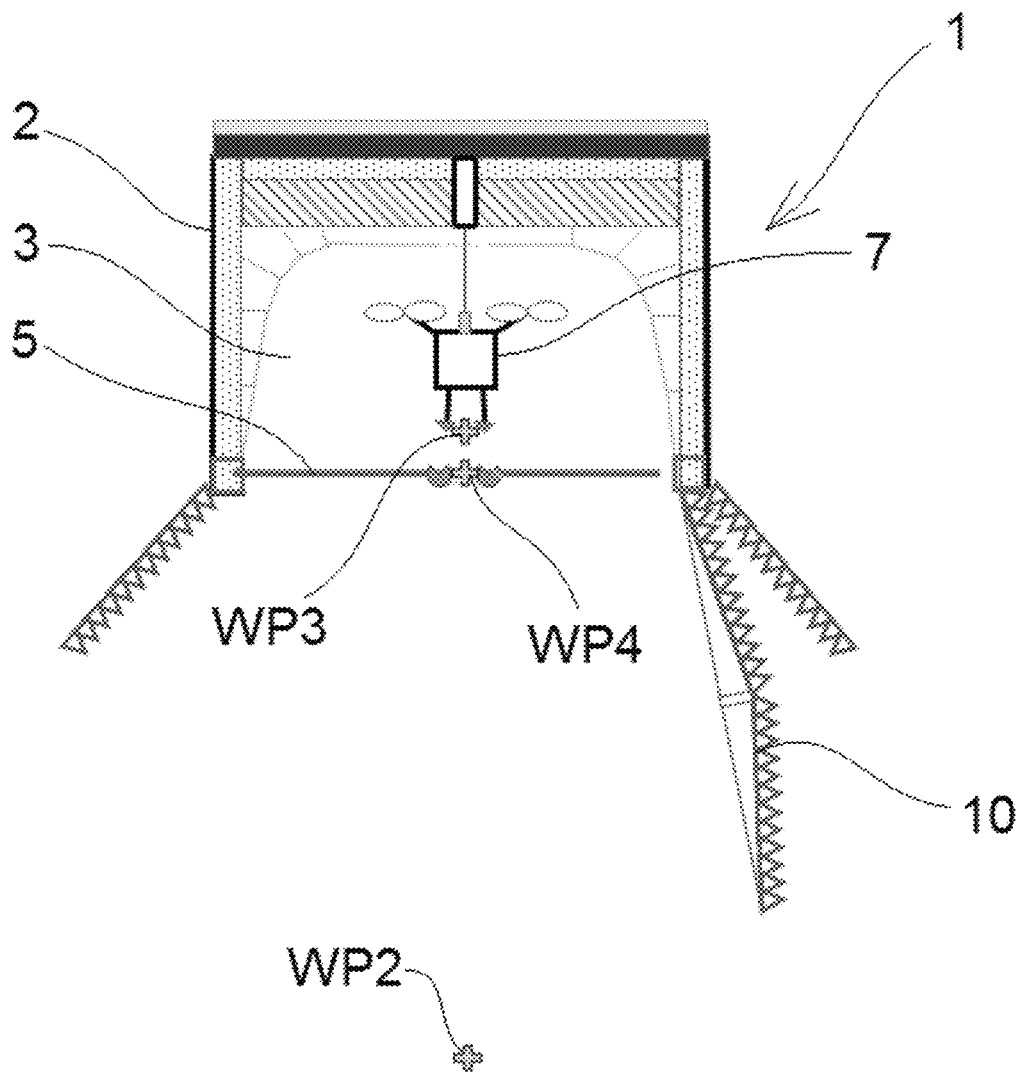
FIG. 6 illustrates a schematic view of a drone station in accordance with at least some embodiments of the present invention, wherein a fifth step of a drone landing sequence is shown.

In FIG. 6 a schematic view of a drone station 1 in accordance with at least some embodiments of the present invention is illustrated, wherein a fifth step of a drone landing sequence is shown. The at least one memory and the computer program code are configured to, with the at least one processing core, cause the drone station 1 to receive a signal that the drone 7 is positioned within the cavity 3. Subsequently, the structure 5 is moved into the first position in order to serve as a landing platform for the drone 7. The drone 7 hoovers above the structure 5 at the third waypoint WP3 within the cavity 3 during movement of the structure 5. This is possible because the structure 5 is permeable to air. As air is allowed to pass through the structure 5, for example in the form of a grating, the movement of the structure 5 only induces a negligible air flow in the cavity 3, and therefore the drone 7 is able to maintain its position within the cavity 3. When the structure 5 is in the first position, the hoovering drone 7 can land on the structure 5 as shown and described in connection with FIG. 7.

Figure 7:
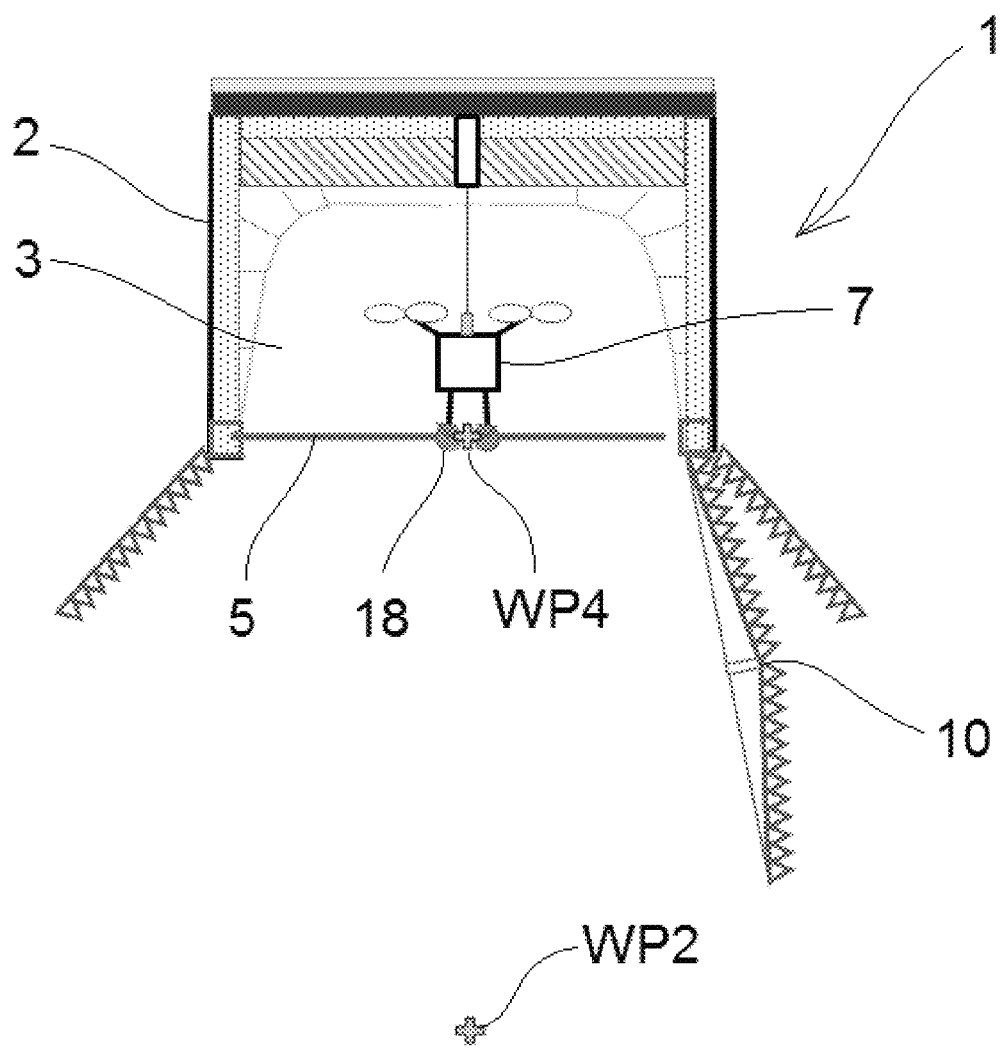
FIG. 7 illustrates a schematic view of a drone station in accordance with at least some embodiments of the present invention, wherein a sixth step of a drone landing sequence is shown.

In FIG. 7 a schematic view of a drone station 1 in accordance with at least some embodiments of the present invention is illustrated, wherein a sixth step of a drone landing sequence is shown. When the structure 5 is in its first position, the drone 7 can move downwards to a fourth waypoint WP4 where the drone 7 is in contact with the structure 5 serving as a landing and storage platform. Landing of the drone 7 on the structure 5 is easily possible because of the structure 5 being permeable to air. Next, the drone 7 can turn off its systems providing lift and thrust. The drone station 1 may comprise a magnetic docking system 18. The magnetic docking system 18 is comprised by the structure 5. The magnetic docking system 18 is configured to engage with a docking piece of the drone 7, thus forming a magnetic connection strong enough to hold the drone 7 in its storage position on the structure 5.

Figure 8:
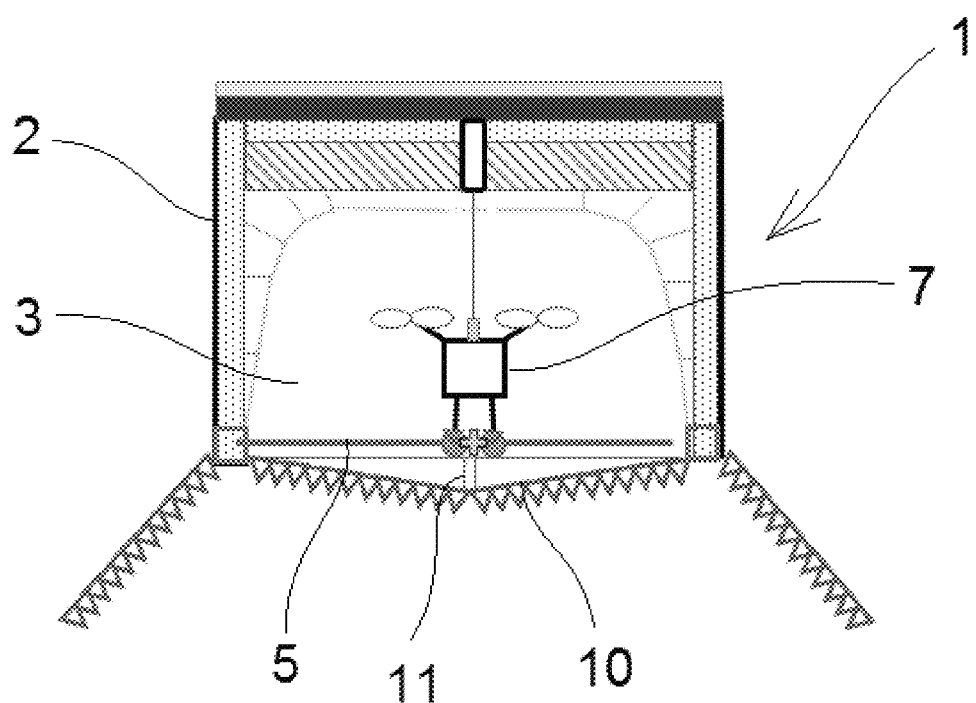
FIG. 8 illustrates a schematic view of a drone station in accordance with at least some embodiments of the present invention, wherein a seventh step of a drone landing sequence is shown.

In FIG. 8 a schematic view of a drone station 1 in accordance with at least some embodiments of the present invention is illustrated, wherein a seventh step of a drone landing sequence is shown. In the seventh and final step, the door 10 moves into the closed position in which the ventral access is covered by the door 10. Further, the docking/undocking aid system 16 may switch off.

During storage of the drone 7 on the structure 5 charging of the batteries of the drone 7 may take place. The drone 7 can stay within the cavity 3 of the housing 2 of the drone station 1 protected from the outer environment until needed again. The charging system may be used periodically in order to keep the batteries of the drone 7 in operational condition.

Further, a heating system may be in use within the cavity 3 during storage of the drone 7. The heating system may be controlled depending on the ambient air temperature and/or depending on the temperature within the cavity 3. Therefore, any ice or snow present within the cavity 3 can melt. As the door 10 may comprise a drain hole 11, liquids present in the cavity 3 can flow through the structure 5 and the drain hole 11 to the outside of the housing 2 of the drain station 1.

Figure 9:
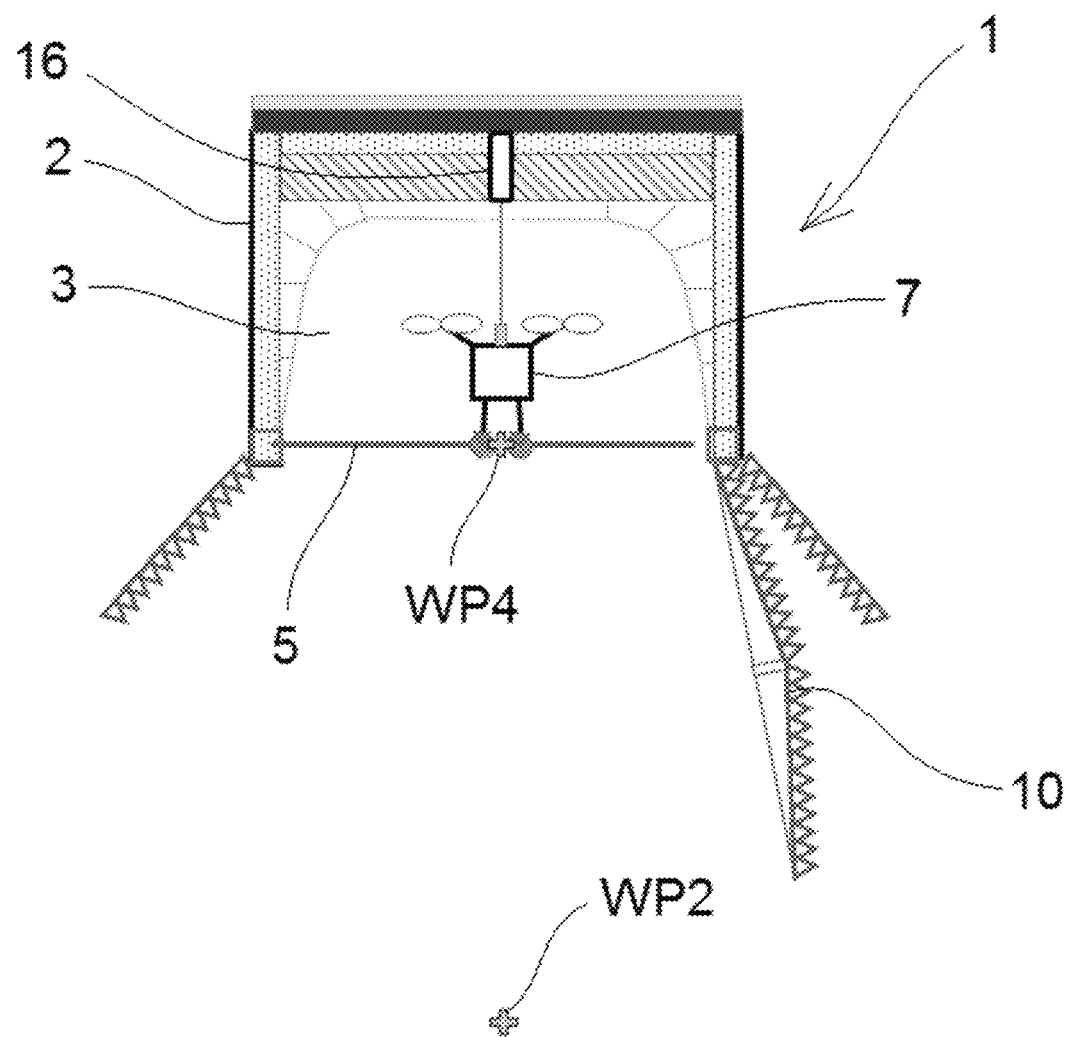
FIG. 9 illustrates a schematic view of a drone station in accordance with at least some embodiments of the present invention, wherein a first step of a drone starting sequence is shown.
Figure 11:
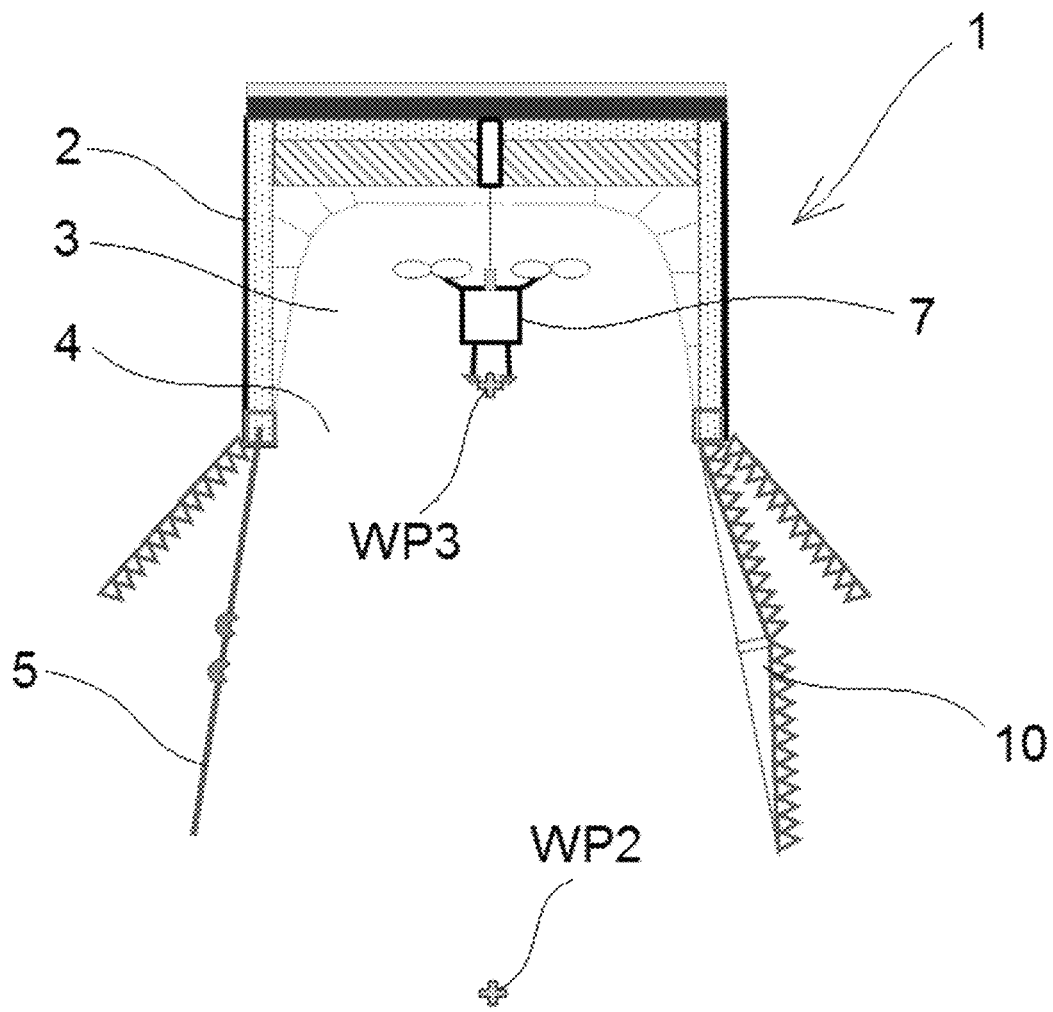
FIG. 11 illustrates a schematic view of a drone station in accordance with at least some embodiments of the present invention, wherein a third step of a drone starting sequence is shown.

In FIG. 9 a schematic view of a drone station 1 in accordance with at least some embodiments of the present invention is illustrated, wherein a first step of a drone starting sequence is shown. As can be seen, the docking/undocking aid system 16 switches on. Further, the door 10 moves from the closed position into the open position in order to provide an exit out of the cavity 3 through the ventral access for the drone 7. Additionally, the drone 7 can turn on its systems providing lift and thrust. Furthermore, the solenoid in the magnetic docking system 18 is operated so that the platform side magnetic piece is allowed to disengage from the docking piece of the drone 7. As a result, the drone freely rests on the structure 5 serving as a starting platform for the drone 7. Subsequently, the drone 7 can take-off in vertical or substantially vertical direction inside the cavity 3 of the housing 2 of the drone station 1. Separation from the structure 5 can take place in a safe way in order to prevent any collision with the structure 5 while the platform moves into the second position as shown in FIG. 11. The heating system may be further switched off prior to opening the door 10.

Figure 10:
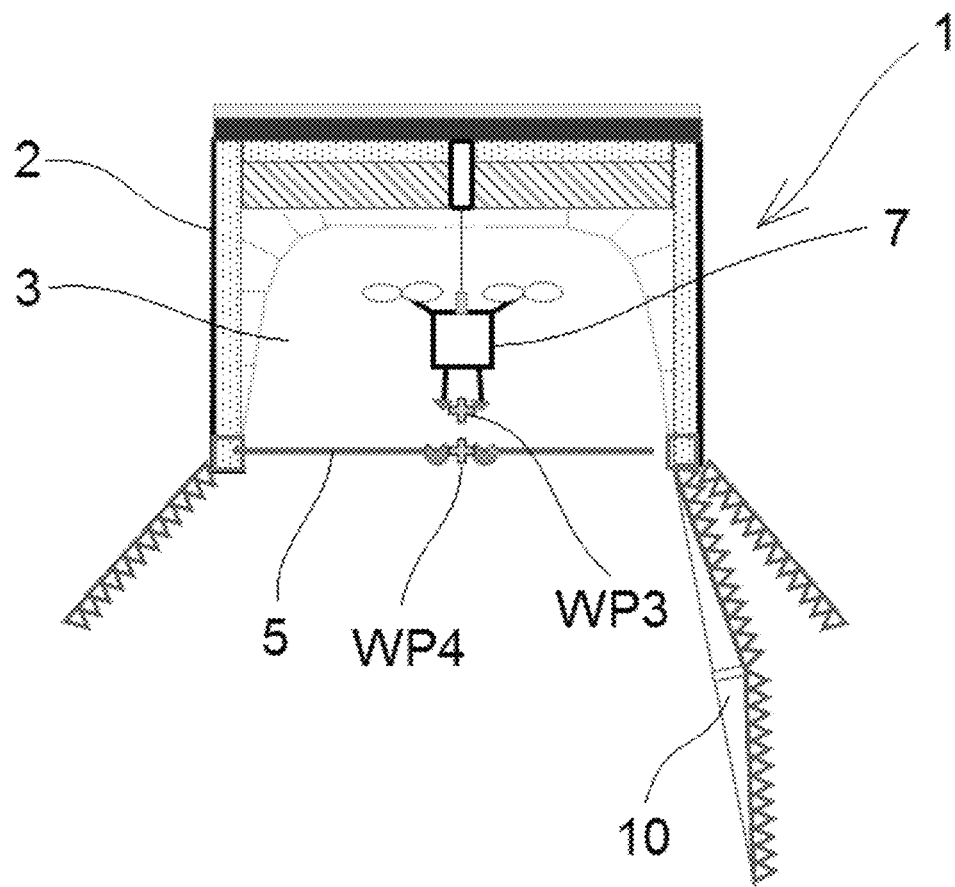
FIG. 10 illustrates a schematic view of a drone station in accordance with at least some embodiments of the present invention, wherein a second step of a drone starting sequence is shown.

In FIG. 10 a schematic view of a drone station 1 in accordance with at least some embodiments of the present invention is illustrated, wherein a second step of a drone starting sequence is shown. The drone 7 has started from the structure 5, moved to the third waypoint WP3 and hoovers within the cavity 3. The third waypoint WP3 is sufficiently far away from the structure 5 in order to avoid any potential collision between the drone 7 and the structure 5 during movement of the structure 5. Take-off takes place in vertical or substantially vertical direction inside the cavity 3 of the housing 2 of the drone station 1. Separation from the structure 5 can take place in a safe way in order to prevent any collision with the structure 5 while the platform moves into the second position as shown in FIG. 11. The at least one memory and the computer program code are configured to, with the at least one processing core, cause the drone station 1 to receive a signal that the drone 7 has started from the structure 5 and is positioned within the cavity 3, i.e. hoovering within the cavity 3. Subsequently, movement of the structure 5 into the second position takes place.

In FIG. 11 a schematic view of a drone station 1 in accordance with at least some embodiments of the present invention is illustrated, wherein a third step of a drone starting sequence is shown. The structure 5 has moved from the first position, wherein the structure serves as a starting platform for the drone 7, to the second position, wherein an exit out of the cavity 3 via the opening 4 is provided. As the structure 5 is permeable to air, only a negligible air flow is induced by movement of the structure 5 from the first position to the second position. The at least one memory and the computer program code are configured to, with the at least one processing core, cause the drone station 1 to transmit a signal to the drone 7 that the structure 5 has moved into the second position. Subsequently, the drone 7 can exit the cavity 3 through the opening 4 to waypoint WP2 as shown in FIG. 12.

Figure 12:
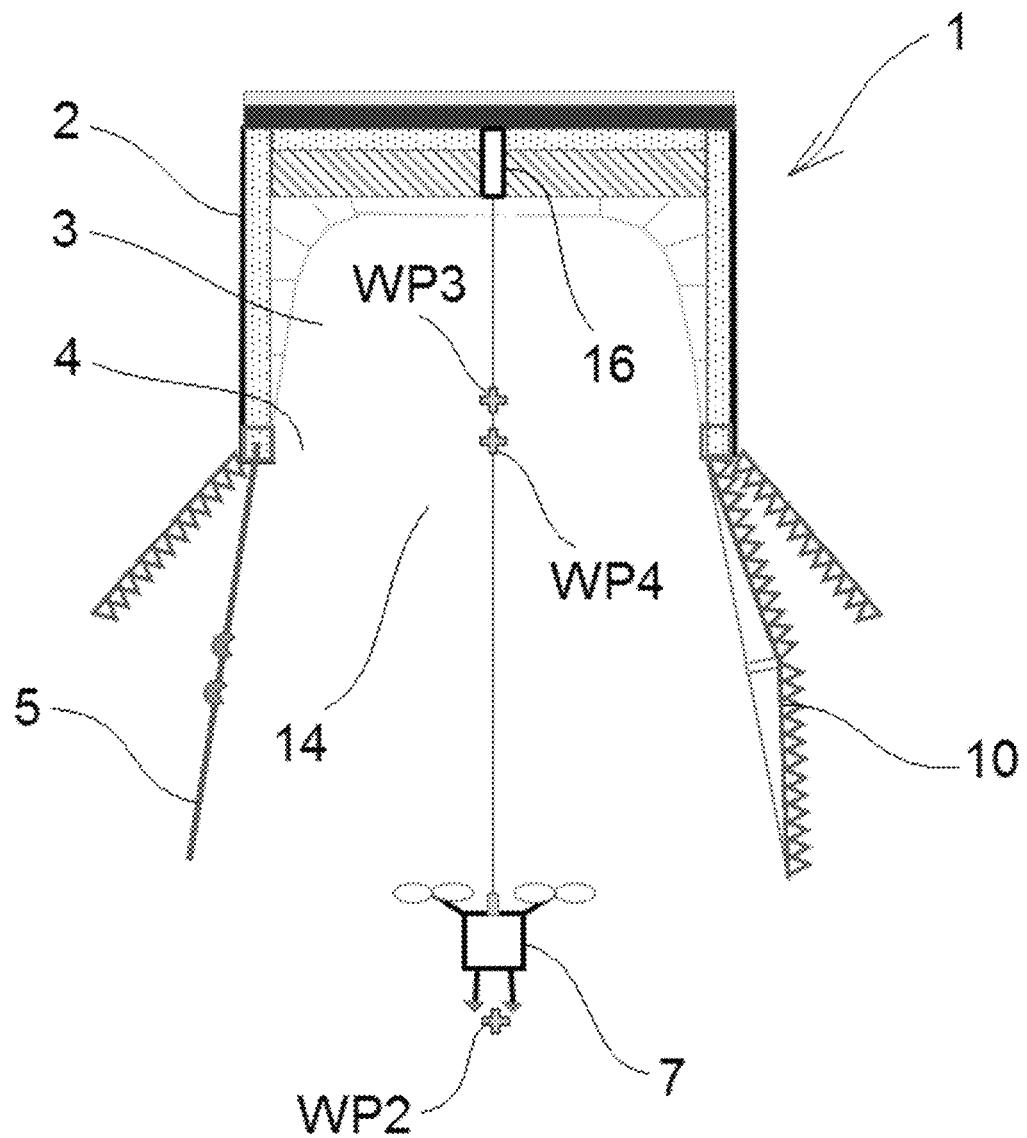
FIG. 12 illustrates a schematic view of a drone station in accordance with at least some embodiments of the present invention, wherein a fourth step of a drone starting sequence is shown.

In FIG. 12 a schematic view of a drone station 1 in accordance with at least some embodiments of the present invention is illustrated, wherein a fourth step of a drone starting sequence is shown. The drone 7 has left the cavity 3 of the drone station 1 via the ventral access. The drone 7 is shown in a position underneath or below the drone station 1 at the second waypoint WP2. Movement of the drone 7 from the drone station 1 typically takes place downwards in vertical direction and may be supported by the docking/undocking aid system 16.

Figure 13:
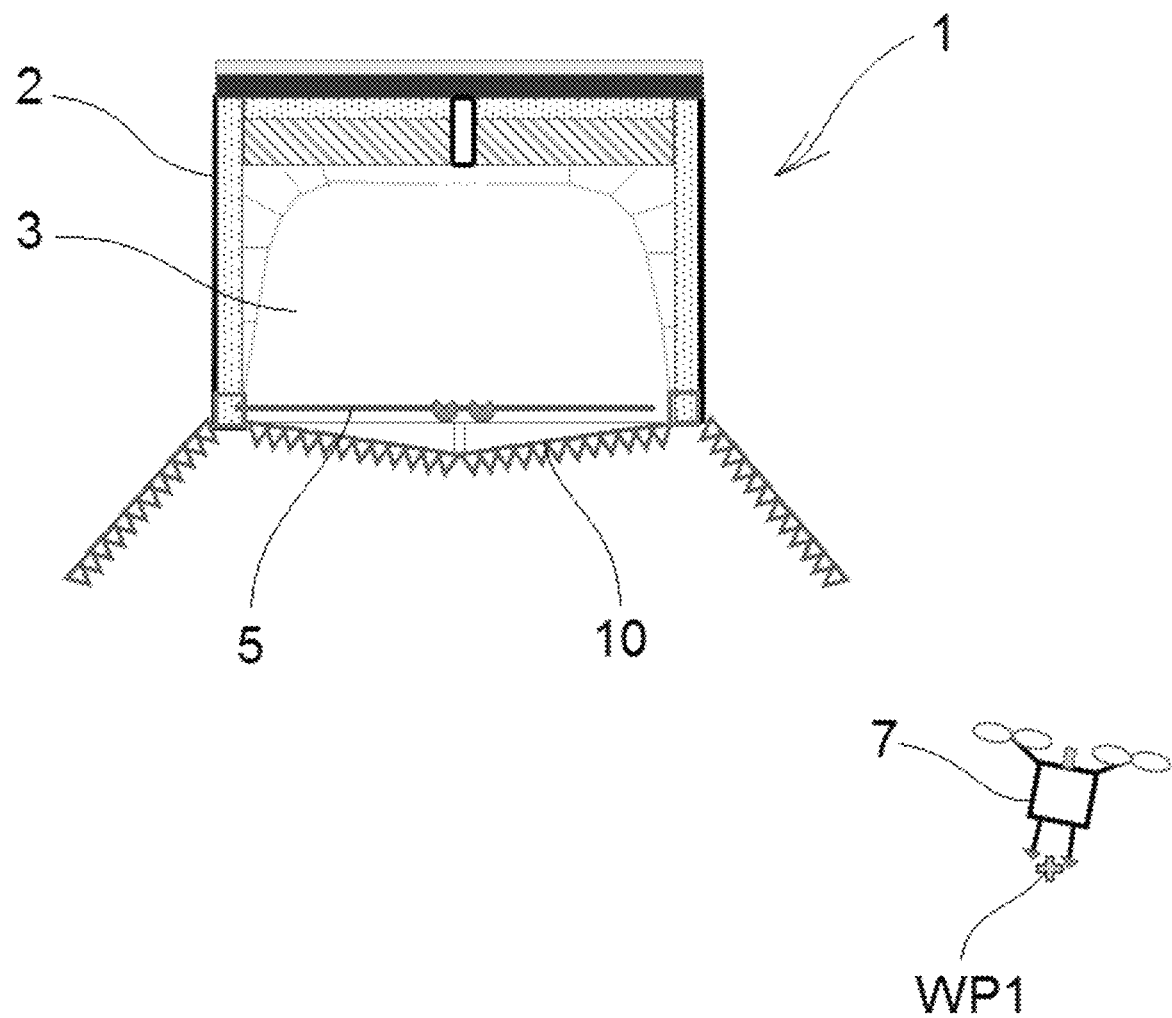
FIG. 13 illustrates a schematic view of a drone station in accordance with at least some embodiments of the present invention, wherein a fifth step of a drone starting sequence is shown.

In FIG. 13 a schematic view of a drone station 1 in accordance with at least some embodiments of the present invention is illustrated, wherein a fifth step of a drone starting sequence is shown. The drone 7 has moved from the second waypoint WP2 to the first waypoint WP1 which has a vertical and a horizontal offset from the drone station 1. The drone 7 is now sufficiently far away from the drone station 1 and ready to start any desired operation.

Figure 14:
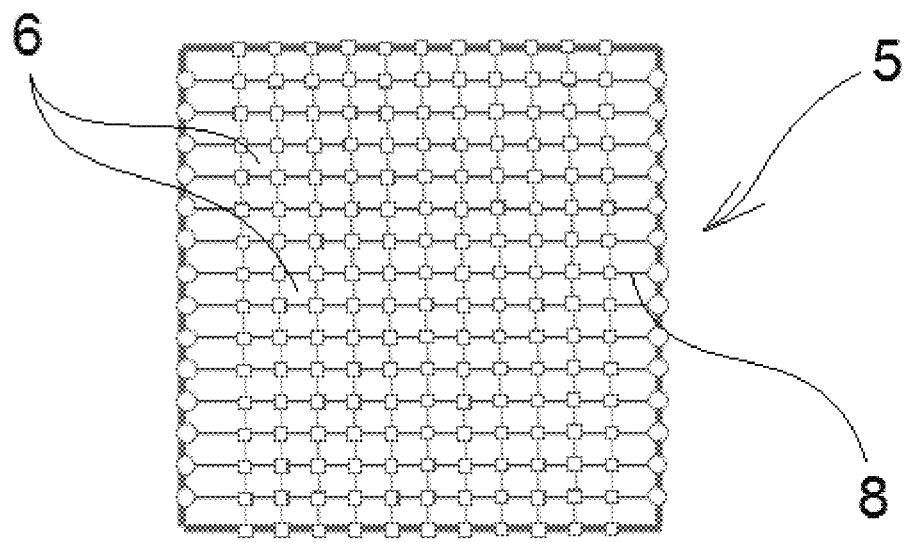
FIG. 14 illustrates a schematic top view of a drone platform formed by a structure permeable to air (grating) of a drone station in accordance with at least some embodiments of the present invention.
Figure 15:
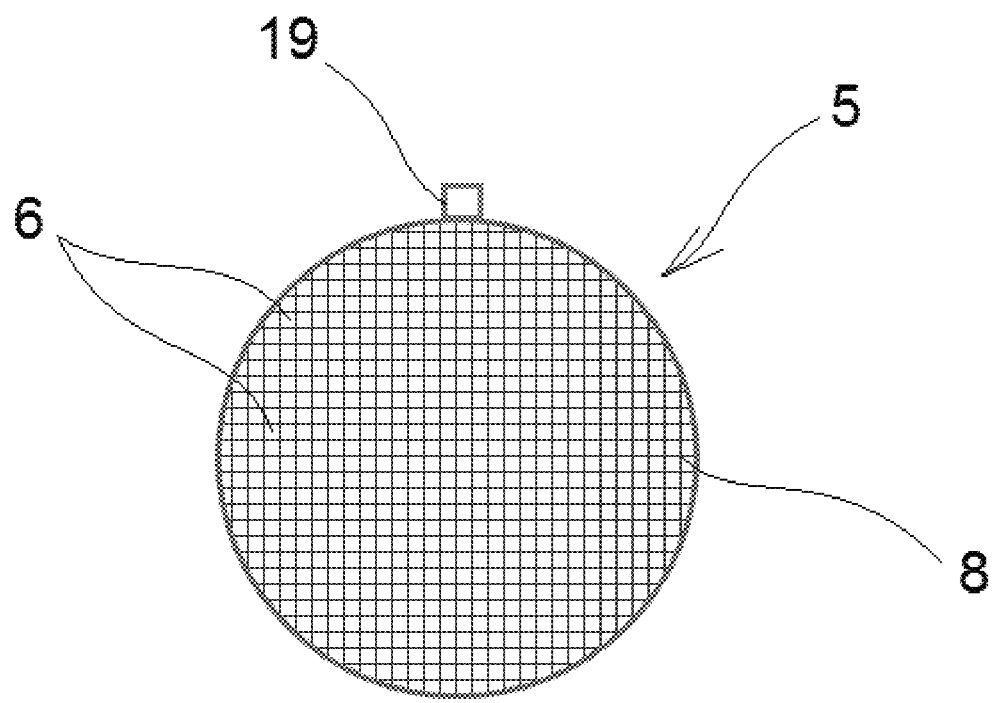
FIG. 15 illustrates a schematic top view of another grating of a drone station in accordance with at least some embodiments of the present invention.

In FIGS. 14 and 15 schematic top views of a grating 8 of a drone station 1 in accordance with at least some embodiments of the present invention are illustrated. The structure 5 in the form of a grating 8 serves as a storage platform, a starting platform and a landing platform for a drone 7. Of course, the grating 8 may also serve as a charging platform for the drone 7. The grating 8 is largely permeable to air due to a plurality of openings 6 through the structure 5. In other words, the grating 8 allows air to flow through it, thus preventing aerodynamic interferences between the platform and the drone 7. Movement of the grating 8 does not create or only creates a negligible amount of flow disturbance to the air near the drone 7. Consequently, the drone 7 is able to hoover at a defined position and to fly along a stable path or a defined trajectory during a landing and a take-off sequence within the cavity 3 of the housing 2 of the drone station 1. The structure 5 may be, for example, hinged to a frame of the housing 2 in order to allow movement of the structure 5 from a first position into a second position.

Figure 16:
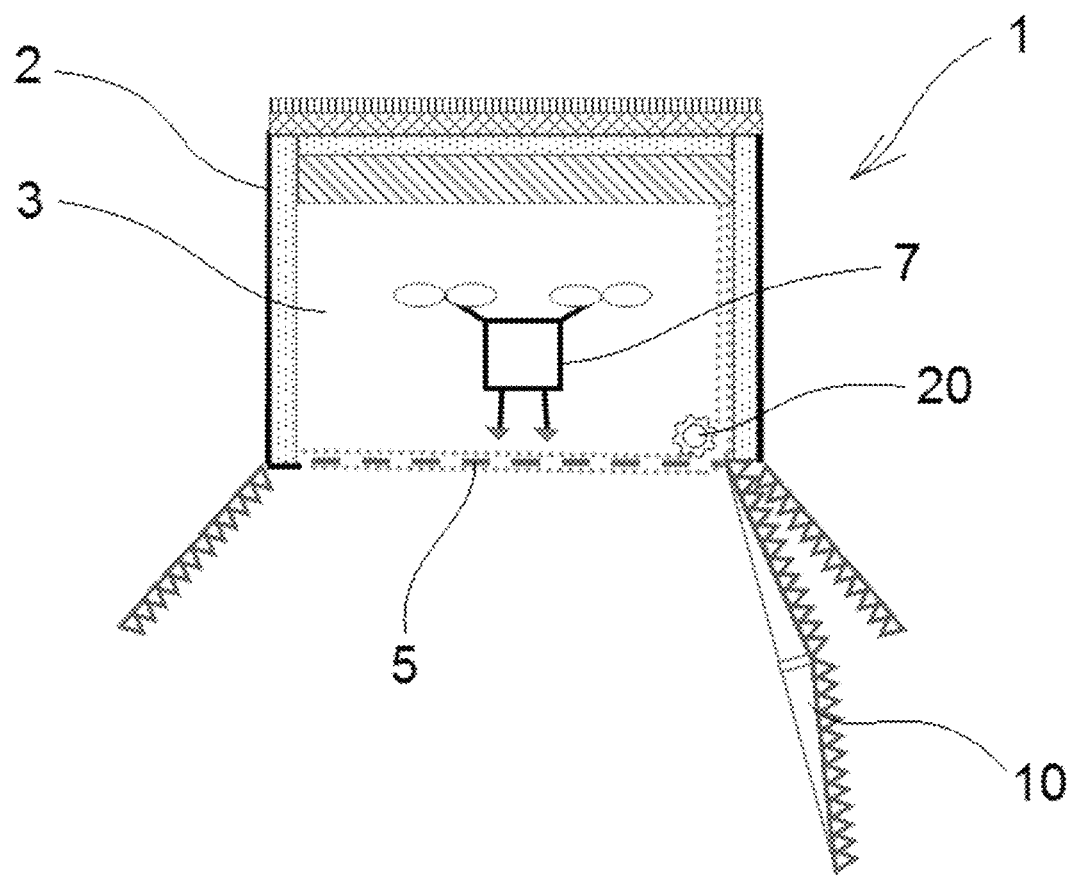
FIG. 16 illustrates a schematic view of another drone station in accordance with at least some embodiments of the present invention, wherein another structure is in a first position.
Figure 17:
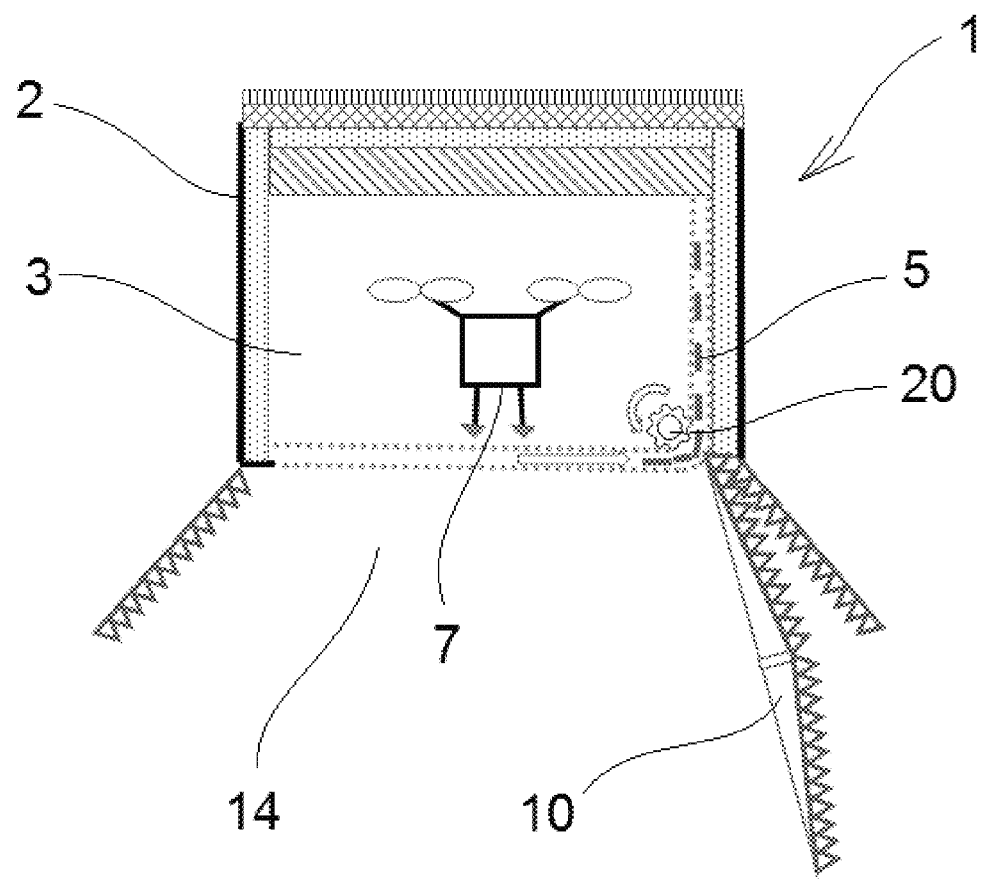
FIG. 17 illustrates another schematic view of another drone station in accordance with at least some embodiments of the present invention, wherein another structure is in a second position.

In FIG. 16 a schematic view of another drone station 1 in accordance with at least some embodiments of the present invention is illustrated, wherein another structure 5 is in a first position. The drone station 1 comprises a housing 2 having a cavity 3 and a ventral access to the cavity 3. Additionally, the drone station 1 comprises a structure 5 permeable to air. The structure is configured to be moved from a first position into a second position and reverse. A platform for landing, storing and starting of a drone 7 is provided by the structure 5 within the cavity 3 in the first position as shown in FIG. 16. As can be seen in FIG. 17, the structure 5 has moved from the first position into a second position. An entry into the cavity 3 or an exit out of the cavity 3 through the ventral access is provided for the drone 7 in the second position of the structure 5. The structure 5 may be, for example, moved from the first position into the second position or in reverse direction by rotating a driving wheel mechanism 20.

In FIG. 18 a schematic view of a yet further drone station 1 in accordance with at least some embodiments of the present invention is illustrated. The drone station 1 comprises a processor 22, a memory 23, a transmitter 24, a receiver 25, and a user interface 26.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in providing a network of drone stations.

REFERENCE SIGNS LIST 1 drone station
2 housing
3 cavity
4 opening of housing
5 structure
6 opening through structure
7 drone
8 grating
9 hinge
10 door
11 drain hole
12 top of housing
13 object
14 ventral access area
15 scarf
16 aid system
17 damper
18 magnetic docking system
19 hinge
20 wheel driving mechanism
21 marker
22 processor
23 memory
24 transmitter
25 receiver
26 user interface
WP1 first waypoint
WP2 second waypoint
WP3 third waypoint
WP4 fourth waypoint

CITATION LIST

Patent Literature

KR 2017114463 A
EP 3241747 A1

The invention claimed is:
1. A drone station comprising:
a housing having a cavity, and
a structure permeable to air and movable from a first position into a second position and reverse, wherein a platform for landing, storing and starting of a drone is provided by the structure within the cavity in the first position, and wherein an entry into the cavity or an exit out of the cavity through a ventral access in a bottom of the housing is provided for the drone in the second position,
wherein the drone station further comprises a door movable from an open position into a closed position and reverse separately from the structure, wherein the door is located below the structure and covers the ventral access in the closed position.

2. The drone station according to claim 1, wherein the structure comprises a plurality of openings, borings or holes.

3. The drone station according to claim 1, wherein the structure comprises a grating, a grid, an array of objects having at least one opening, or an array of objects between which openings are arranged.

4. The drone station according to claim 1, wherein the door is configured to move prior or after movement of the structure.

5. The drone station according to claim 4, wherein the door comprises a drain hole.

6. The drone station according to claim 1, wherein the drone station is hanging from a support structure or arranged on top of a support structure or otherwise coupled to a support structure.

7. The drone station according to claim 1, wherein the drone station further comprises a transmitter and a receiver for bidirectional communication with the drone and/or the drone station is configured to be remotely operated by an operator.

8. The drone station according to claim 1, wherein the drone station further comprises a protective scarf attached to the housing.

9. The drone station according to claim 1, wherein the drone station further comprises a charging system capable of charging batteries of the drone.

10. The drone station according to claim 1, wherein the drone station further comprises an electric heating system.

11. A method of operating a drone station, the method comprising:
 moving a door of the drone station from a closed position into an open position, wherein the door is located below a structure permeable to air and covers a ventral access in a bottom of a housing of the drone station in the closed position,
 receiving by the drone station a signal that a drone has started from the structure, and
 moving the structure from a first position into a second position, wherein a platform for starting of the drone is provided by the structure within a cavity of the housing of the drone station in the first position, and wherein an exit out of the cavity through the ventral access in the bottom of the housing is provided for the drone in the second position.

12. A non-transitory computer readable medium having stored thereon a set of computer implementable instructions capable of causing a computing device, in connection with a drone station, at least to:
 cause a door of the drone station to move from a closed position into an open position, wherein the door is located below a structure permeable to air and covers a ventral access in a bottom of a housing of the drone station in the closed position,
 receive a signal that a drone has started from the structure, and
 cause the structure to move from a first position into a second position, wherein a platform for starting of the drone is provided by the structure within a cavity of the housing of the drone station in the first position, and wherein an exit out of the cavity through the ventral access in the bottom of the housing is provided for the drone in the second position.

* * * * *